Patented Aug. 10, 1948

2,446,974

UNITED STATES PATENT OFFICE 2,446,974

SYNTHESIS OF A PENICILLIN-PROTEIN REACTION PRODUCT

Bacon F. Chow, Highland Park, N. J., assignor to E. R. Squibb & Sons, New York, N. Y., a corporation of New York No Drawing. Application September 23, 1944, Serial No. 555,598

6 Claims. (Cl. 260—117)

This invention relates to, and has for its object the provision of, certain penicillin-protein compounds, and methods of preparing them.

It has been found that penicillins and water-soluble, non-antigenic, non-conjugated (i. e., simple or derived) proteins can be interacted to form compounds which possess the antibacterial activity of the free penicillin and the physical and physiological properties of the protein; and when (as preferred) the compounds are obtained by combining alkali-penicillins with proteins utilizable as blood substitutes, they possess in addition the property of being excreted much more slowly, thus greatly enhancing the effective activity of the penicillin and/or enabling reduction of the dose required.

The term "penicillin," as generically employed herein, means the genus of chemically-related, similarly-acting antibacterial compounds exemplified by penicillin G (cf. Wintersteiner and MacPhillamy application Serial No. 540,140, filed June 13, 1944) and penicillin F (cf. Wintersteiner and Adler application Serial No. 540,543, filed June 15, 1944); and comprehends the acid, alkali-salt, and intermediate alkali-neutralization forms of the compounds. The nomenclature of the proteins referred to herein is that adopted by the American Society of Biochemists. The term "water-soluble" is employed herein in the sense generally understood in protein chemistry, i. e., as including colloidal solutions. The term "compound" is employed herein in its most comprehensive sense, embracing, for example, the interaction products known as complexes and conjugates. The term "non-antigenic" has reference, of course, to antigenicity in the human being.

The penicillin employed in the practice of this invention may be either pure or crude, and (of course) either naturally (mold) derived or synthetic. Preferably, the crude penicillin is of such purity as to be therapeutically-utilizable per se. A cruder penicillin may be employed, however, if the impurities and the protein do not interact, the precipitation of the penicillin-protein interaction product effecting the necessary purification; and the invention comprehends production of the penicillin-protein interaction product as a means of purifying (including concentrating) crude penicillins (including low-potency penicillin extracts). The utilizable alkali-penicillins include, inter alia, the ammonium, sodium, and calcium salts.

Of the utilizable proteins, those of human derivation (e. g., human serum albumin) are preferred, because of their positive nonantigenicity. Such proteins are available as the products or by-products of blood processing for the production of blood substitutes. Water-soluble non-conjugated proteins of other derivation may also be employed, if they are (or have been rendered) non-antigenic. Thus, the utilizable proteins may be of the following types, inter alia; albumins, glutelins, histones, protamines, and proteoses. The following specific proteins are exemplificative of those utilizable: human serum albumin; ovalbumin; lactalbumin; glutenin; globin; fish isinglass; gelatin; and soybean protein or bovine plasma albumin modified to make it non-antigenic and non-toxic (cf. Chow, van Dyke, and Greep application Serial No. 458,994, filed Septemper 19, 1942, now abandoned). Also, compositions essentially comprising a water-soluble non-antigenic, non-conjugated protein, e. g., human serum or plasma, may be utilized.

The compounds of this invention may be obtained by interacting the penicillin and protein in aqueous solution, preferably at a pH of about 6–8, treating the reaction mixture with a protein precipitant, and purifying the precipitated compound. The aqueous solution of the compound initially obtained (the reaction mixture) may be therapeutically used as such (after adjustment of the concentration, of the compound, if necessary), inasmuch as any excess or unbound protein or penicillin would not interfere with such use; and the reaction mixture (especially when prepared from an alkali-penicillin and a protein utilizable as a blood substitute, and containing little unbound penicillin) is sufficiently stable to be commercially distributed as an ampuled solution, disnecessitating the now-required extemporaneous preparation of penicillin solutions. Preferably, the precipitate is purified coincidentally with the drying thereof, and the drying is prefterably effected by lyophilizing (vacuum-freeze-drying) to obtain a porous solid which can be readily redissolved.

The interaction of the penicillin and the protein may be effected, for example, by the addition of the penicillin to an aqueous solution of the protein, or by equilibrating an aqueous solution of the penicillin and an aqueous solution of the protein through a protein-impermeable membrane (e. g., Cellophane). The protein-precipitants utilizable in the practice of this invention include, inter alia, volatile alcohols (such as ethyl alcohol) and salting-out salts (such as ammonium sulfate and sodium sulfate). The salting-out salts may be separated from the precipitated product by dialysis; and the alcohols may be separated from the precipitated product by evaporation, this separation being advantageously effected coincidentally with lyophilizing the product.

The following example is illustrative of the invention: One part by volume of a 0.1% aqueous solution of pure, crystalline sodium-penicillin G buffered to pH 7.8 is added to nine parts of a 4% solution of an electrophoretically-pure human serum albumin at a temperature of about 1–5° C. After 12–16 hours at this temperature, the compound formed is precipitated (in the cold) by adding absolute ethyl alcohol until the alcohol concentration of the mixture is 40%, and the mixture is centrifuged (in the cold) and the precipitate is washed twice with 40% aqueous ethyl alcohol to remove the free or unbound penicillin. The precipitate is then dissolved in water and lyophilized; preferably the solution is volumetrically subdivided into ampules and lyophilized in the ampules, as in the case of commercial sodium-penicillin (G). The product, a fluffy powder, is electrophoretically homogeneous. It is therapeutically utilizable either in powder form for dusting on or into wounds (including burns), or in the same manner as the pure, crystalline sodium-penicillin G used in its preparation; and it possess an in vitro antibiotic activity comparable with that of the sodium-penicillin G, but is excreted much more slowly, and hence possesses a much greater and/or more prolonged effectiveness in vivo. Moreover, by virtue of its possessing physical and physiological properties comparable to those of human serum albumin, the product can be therapeutically employed for the same purpose as human serum albumin, i. e., as a blood substitute.

A comparable product may be obtained by using commercial sodium- or calcium-penicillin (G) in place of the pure, crystalline sodium-penicillin G in the foregoing procedure. When used for this purpose, the commercial sodium- or calcium-penicillin need not have been lyophilized; i. e., the aqueous solution thereof obtained as the end-product of the extraction procedure in the production of penicillin may be used as such or after partial concentration.

Alternatively, precipitation of the compound may be effected by adding sufficient saturated ammonium sulfate solution to precipitate the compound completely; in which case, the precipitate is washed with saturated ammonium sulfate solution to remove free or unbound penicillin and then dissolved in water, and the solution is dialyzed to remove ammonium sulfate, and lyophilized.

The invention may be variously otherwise embodied within the scope of the appended claims.

I claim:
1. The method which comprises interacting a penicillin and a water-soluble, non-antigenic, non-conjugated protein in aqueous solution, treating the reaction mixture with a protein-precipitant, and purifying the precipitated compound.
2. The method which comprises interacting a penicillin and a water-soluble, non-antigenic, non-conjugated protein in aqueous solution, precipitating the compound formed by adding a volatile alcohol, dissolving the precipitate in water, and lyophilizing the solution.
3. The method which comprises interacting sodium-penicillin-G and a water-soluble, non-antigenic, non-conjugated protein in aqueous solution, treating the reaction mixture with a protein precipitant, and purifying the precipitated compound.
4. The method which comprises interacting a penicillin and human serum albumin in aqueous solution, treating the reaction mixture with a protein precipitant, and purifying the precipitated compound.
5. The method which comprises interacting a penicillin and gelatin in aqueous solution, treating the reaction mixture with a protein precipitant, and purifying the precipitated compound.
6. The method of preparing a dusting powder for wounds, which comprises interacting a penicillin and a water-soluble, non-antigenic, non-conjugated protein in aqueous solution, treating the reaction mixture with a protein-precipitant, purifying the precipitated compound, dissolving the precipitate in water, and lyophilizing the solution.

BACON F. CHOW.

REFERENCES CITED

The following references are of record in the file of this patent:

Cohn, "Chem. Reviews," vol. 28 (1941), pp. 395–417.
Florey et al., "The Lancet" (Aug. 16, 1941), pp. 177–188.
Meyer et al., "Science" (July 3, 1942), pp. 20–21.
Van Bruggen et al., "J. Biol. Chem." (May 1943), pp. 365–378.
Bergy, "W. Va. Med. Jour." (Aug. 1943), p. 274.
Robinson et al., "Science" (Oct. 8, 1943), pp. 329–330.
Lancet (Dec. 11, 1943), page 743.
Goodman, "Jour. Am. Med. Ass'n." (Mar. 25, 1944), page 954.
Jour. of the Amer. Med. Ass'n., Oct. 7, 1944, vol. 126, p. 367.
Surgery (Dec. 1944), pages 937 and 938.